United States Patent [19]
Strömberg

[11] Patent Number: 6,064,333
[45] Date of Patent: May 16, 2000

[54] PHASED ARRAY RADAR SYSTEM FOR TRACKING

[75] Inventor: Dan Strömberg, Linköping, Sweden

[73] Assignee: Telefonatkiebolaget LM Ericsson, Stockholm, Sweden

[21] Appl. No.: 08/952,119

[22] PCT Filed: May 9, 1996

[86] PCT No.: PCT/SE96/00609

§ 371 Date: Nov. 7, 1997

§ 102(e) Date: Nov. 7, 1997

[87] PCT Pub. No.: WO96/35962

PCT Pub. Date: Nov. 14, 1996

[30] Foreign Application Priority Data

May 9, 1995 [SE] Sweden .................................. 9501718

[51] Int. Cl.[7] .................................................. G01S 13/42
[52] U.S. Cl. .................... 342/81; 342/95; 342/97; 342/99; 342/108; 342/115; 342/157; 342/158; 342/368
[58] Field of Search ................................. 342/81, 90, 94, 342/95, 96, 97, 99, 107, 108, 115, 135, 139, 140, 157, 158, 368, 371, 372

[56] References Cited

U.S. PATENT DOCUMENTS

| 4,593,286 | 6/1986 | Matthews et al. | 342/88 |
| 4,910,526 | 3/1990 | Donnangelo et al. | 342/455 |
| 5,075,694 | 12/1991 | Donnangelo et al. | 342/455 |

FOREIGN PATENT DOCUMENTS

| 57-154081A | 9/1982 | Japan | G01S 13/60 |

OTHER PUBLICATIONS

"Optimal scheduling of track updates in phased array radars", Sun–Mog Hong; Young–Hun Jung, Aerospace and Electronic Systems, IEEE Transactions on vol.: 34 3, Jul. 1998, pp.: 1016–1022, 1998.
"Targets, sensors and infinite–horizon tracking optimality", Feron, E.; Olivier, C., Decision and Control, 1990., Proceedings of the 29th IEEE Conference on, 1990, pp.: 2291–2292 vol.4, 1990.

*Primary Examiner*—John B. Sotomayor
*Attorney, Agent, or Firm*—Jacobson, Price, Holman & Stern, PLLC

[57] ABSTRACT

A phased array radar system for target tracking having a track initiation unit, a track prediction unit, a scheduling unit, a track selection unit, and a transmitter/receiver unit. The track initiation unit initiates new tracks representing detected aircraft targets. The track prediction unit predicts the expected position and the calculated position uncertainty of the target as a function of time and the minimal, maximal and optimal time difference to the next measurement. The scheduling unit performs an independent calculation of a sequence of possible time intervals to the next measurement in accordance with specified conditions, and then performs an intersection operation between the calculated sequences of time intervals in order to calculate the optimal time interval to the next measurement. A track selection unit selects that track which has the shortest remaining time interval, $K_i$, to the next measurement and decreases the time interval to the next measurement for all other tracks with $K_i$. The transmitter/receiver unit registers an echo from the target and calculates, in a known manner, values for distance, speed, bearing and uncertainty in the distance and speed calculations, which are transferred to the track prediction unit for further calculations.

15 Claims, 5 Drawing Sheets

PHASED ARRAY RADAR SYSTEM FOR TRACKING

BACKGROUND OF THE INVENTION

1. Field of the Invention

The present invention relates to a phased array radar tracking system. For radar technical terms in the following description a basic textbook is recommended, e.g. S.Kingsley and S.Quegan, Understanding Radar Systems, McGraw Hill, 1992.

2. Description of the Related Art

The proposed radar design is intended for tracking aircraft targets. The radar system has a phased array antenna, which means that it can be controlled and directed electronically. Each detected aircraft target is followed and represented as a track. The track is a state vector with elements for a set of parameters. The main way of working for the radar is to transmit pulses with a certain pulse repetition frequency and carrier frequency, in a certain direction. After being reflected against a radar target (subsequently called "the target") they may be measured by a receiver. The time delay from transmission to reception of a pulse is proportional to the target distance.

The distance is, however, ambiguous since the pulse frequency value is so high that several pulses are transmitted before the reflection of the first pulse returns. This ambiguity gives rise to an ambiguity problem in calculation of the distance: Each measured time between transmission and reception of a pulse corresponds to several possible ranges. The two-way distance that a certain radar pulse can go in the time interval between two consecutive pulses is called the range-unambiguity interval. The length of the range-unambiguity interval depends on the value of the pulse repetition frequency (PRF). For a radar of this type the number of selectable PRF values usually amounts to some tens. A sequence of pulses transmitted with a certain PRF is called a pulse train. Between each pair of adjacent range-unambiguity intervals there is a blind region dependent on the fact that it takes a certain time to transmit the pulse from the antenna.

Before each new measurement of a target the position of the target as well as the position uncertainty is predicted. A common computation technique for this prediction is Kalman filtering. The position uncertainty forms an uncertainty volume (or uncertainty-region), which grows roughly quadratically with the time since the latest measurement. In order to master both the uncertainty about the target position and the radar-target range-unambiguity, it is necessary that the extension of the uncertainty volume—along the radius between target and radar—is contained completely in one single range-unambiguity interval. Due to the (predicted) target movement in relation to a possibly moving radar this condition is satisfied only during some limited time intervals, namely such time intervals for which the radar-target range and the position uncertainty region for the target lies completely within the limits of one single range-unambiguity interval, depending on the selected PRF value.

How this PRF value, these time intervals and the time point for measurement shall be calculated is one of the problems that have to be solved in a scheduling device of a phased array radar. Several other factors must however also be considered in this calculation.

One factor is associated with a combination of Doppler frequency shifts and ground echo cancellation. If a movement of a target between two pulses in the pulse train equals in radial direction a number of half wave lengths for the carrier wave, the target seems to stand still. For each PRF a number of (equally large) speed unambiguity intervals arises, during which the target speed is unambiguous. Furthermore, all echoes from slow targets must be cancelled (ground echo cancellation). The combination of these two effects leads to "blind spots" in the speed spectrum. This phenomenon is called Doppler blindness.

A third problem occurs as the radar can measure only one target at each instance. For each track to be scheduled, the measurement time intervals assigned to other tracks are already occupied.

A fourth problem is caused by so called "cross-overs": If the position uncertainties of more than one target during some time interval lie in beam sectors that overlap this time interval will be impossible to use for measurement.

The common thing with all these problems is that they depend on the choice of PRF value and scheduled measurement time interval. The problem complexity may grow as further conditions may have to be added on the radar. The problem complexity is a new one as phased array radars are new. Known approaches to solve the problem handle one track at a time by first assigning to it the next free time period, and then calculating—if possible—the PRF value that fulfils all demands. In another approach it is determined which tracks need to be measured each time the radar is "free", which of these tracks that it is most necessary to measure and then a PRF value for this track is calculated.

SUMMARY OF THE INVENTION

The proposed scheduling mechanism solves the stated problem complexity in an optimal and simple way which in addition allows more constraints to be added. This is achieved by giving the invention the design of a phased array radar system for target tracking having a track initiation unit, a track prediction unit, a scheduling unit, a track selection unit, and a transmitter/receiver unit. The transmitter/receiver unit forms a waveform and directs a beam toward a target. The track initiation unit initiates new tracks representing detected aircraft targets. The track initiation unit is connected to a track prediction unit which predicts the expected position and the calculated position uncertainty of the target as a function of time and the minimal, maximal and optimal time difference to the next measurement. A scheduling unit, which is connected to the track prediction unit, performs an independent calculation of a sequence of possible time intervals to the next measurement for each one of two conditions, namely that the measurement time difference will be placed between the calculated minimal and maximal time differences and that range-unambiguity will prevail, and then performs an intersection operation between the so calculated sequences of time intervals in order to calculate the optimal time interval to the next measurement. A track selection unit, connected to the scheduling unit and to the transmitter/receiver unit, selects that track which has the shortest remaining time interval, $K_i$, to the next measurement and decreases the time interval to the next measurement for all other tracks with $K_i$. The transmitter/receiver unit, after directing the waveform beam to the target, registers an echo from the target and calculates, in a known manner, values for distance, speed, bearing and uncertainty in the distance and speed calculations. These values are transferred to the track prediction unit for further calculations.

BRIEF DESCRIPTION OF THE DRAWINGS

In the following, the invention will be described with references to the attached figures, where.

DETAILED DESCRIPTION OF THE PREFERRED EMBODIMENTS

The invention consists of a device which computes the time points and PRF values for updates of a number of established target tracks, by calculation of a time interval sequence for each one of a number of geometrical and other conditions which may be imposed on the measured target in relation to the position and speed of the radar itself. These time interval sequences are then intersected forming a new time interval sequence within which the optimal measurement time interval can be sought.

Figure 1:
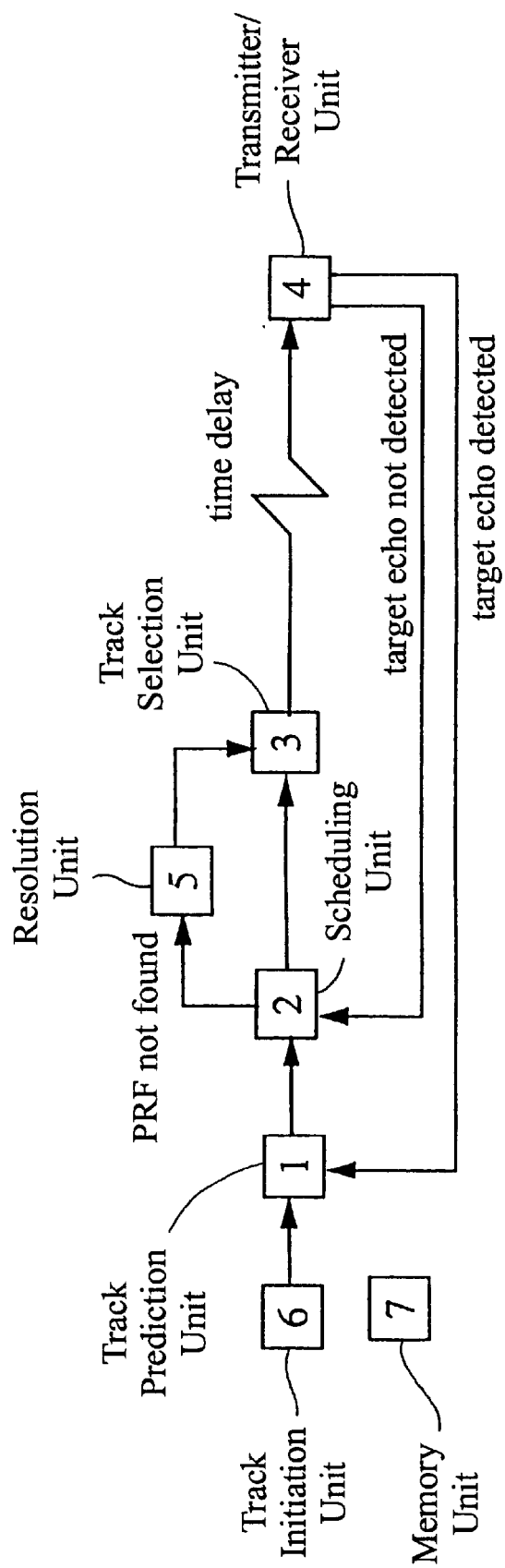
FIG. 1 shows the principal structure of one embodiment of the invention.

On a basic level the radar system according to the invention comprises a track initiation unit 6, a track prediction unit 1, a scheduling unit 2, a track selection unit 3 and a transmission/receiving unit 4, as shown in FIG. 1.

The track initiation unit 6 initiates new tracks. It is connected to the target prediction unit 1 which predicts the expected position of the target and the calculated position uncertainty at the next measurement as a function of time and furthermore the minimal, maximal and optimal measurement time difference.

The track prediction unit 1 is connected to a scheduling unit 2, which makes an independent calculation of a sequence of possible time intervals to the next measurement for two conditions, namely that the measurement time difference has a value between the minimal time difference and the maximal time difference, and that range-unambiguity shall prevail. The unit then makes an intersection operation on the two so calculated interval sequences in order to calculate the optimal time interval to next measurement.

The scheduling unit 2 is connected to a track selection unit 3 which selects the track which has the shortest remaining time interval, $K_j$, to the next measurement and decreases the time interval to next measurement for all other tracks with $K_j$. The track selection unit 3 is connected to a transmission/receiving unit 4 which generates waveform, directs the beam, is designed to register the reflex from the target and calculate, in a known way, range, speed, angle and accuracy in the calculations of range and speed, which parameters are transferred to the track prediction unit 1 for use by the track prediction unit for conducting further calculations.

In certain cases the scheduling unit 2 is not able to calculate any time to the next measurement for any PRF value. In order to manage these cases it is suitable for the radar system to comprise a resolution unit 5 which is connected to the scheduling unit and which can calculate resolution frequencies and possible measuring times for resolution.

Data necessary for the calculations in the different units and for the results from the different units must be stored in some way. It is suitable to use a special memory unit 7 which is connected to all other units for this purpose. Other solutions for providing memory management are however also possible.

In the following paragraphs the different units will be presented in more detail.

The track initiation unit 6 initiates tracks. This is done by using any track detection method which gives initial values of the parameters needed to perform track prediction in track prediction unit 1.

Figure 3:
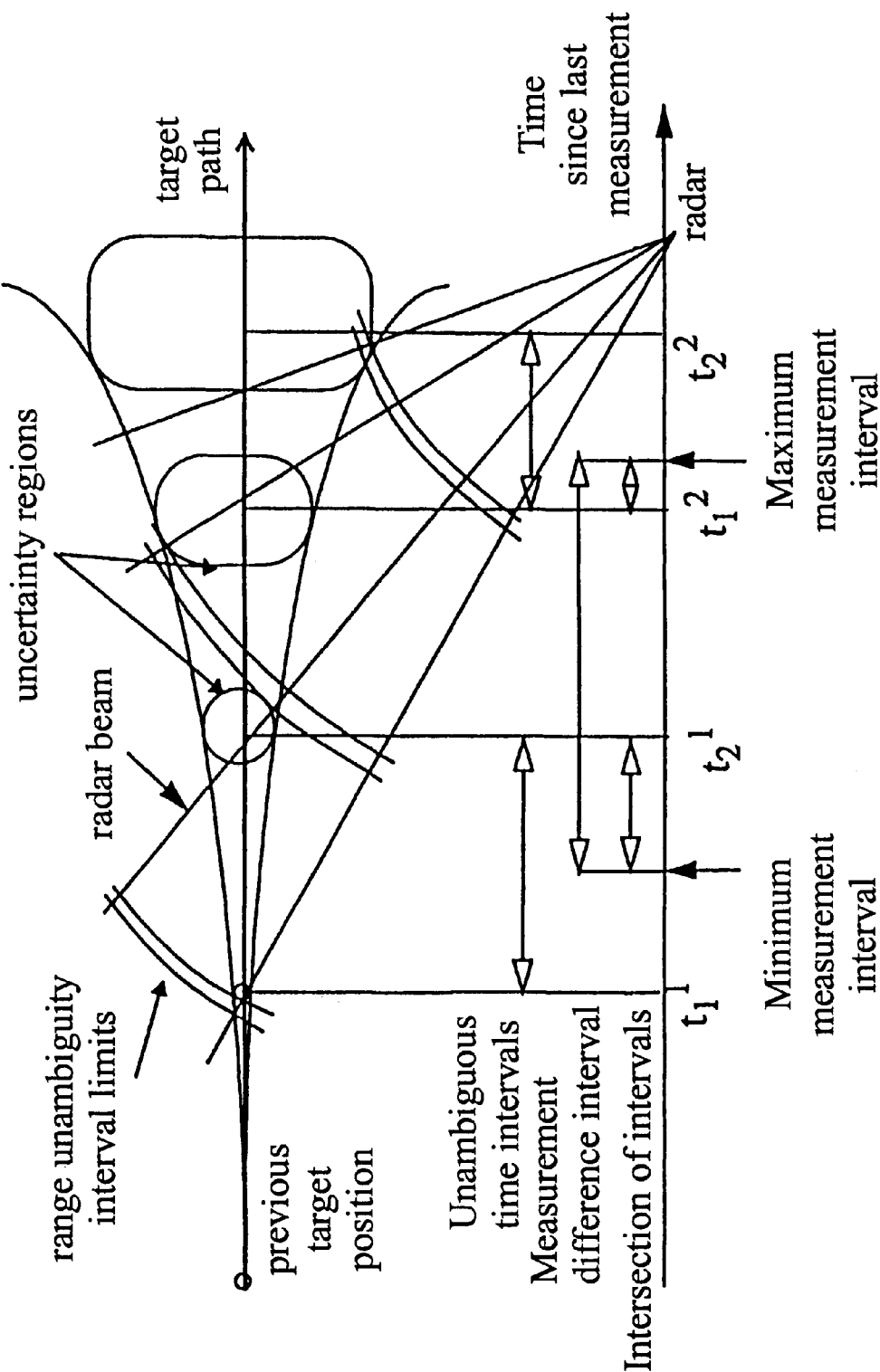
FIG. 3 shows the geometrical relations for an approaching target, where $t_i^k$ denotes the start of time interval number k, if i=1, and the end of the same, if i=2.

The track prediction unit 1 calculates or selects a number of parameters which later will be used by the transmission/receiving unit 4. Using the values obtained from the latest measurements, the target is assigned a target track hypothesis. This can be a straight flight hypothesis or a maneuver hypothesis. The latter might be of different types depending on the turning forces that influences the target. A straight flight hypothesis is characterized by a slow rate of growth in positional uncertainty, and a maneuver hypothesis is characterized by a faster rate of growth in uncertainty—the bigger the hypothetical turning force, the faster the rate of growth in uncertainty. This growth of uncertainty is expressed by the factors $\mu_f(t)$ and $\mu_u(t)$ in the formulas $a_1$ and $a_2$ below, and is illustrated by the breadth of the trumpet shaped opening in FIG. 3. The faster the rate of uncertainty growth, the larger the trumpet opening. For assignment of hypothesis, several known statistical methods are known, the most of which are based on the results of the latest measurements and their position and distance in relation to hypothetical straight flight tracks or turning curves.

Based on the target track hypothesis it is possible to determine some of the factors needed later in order to estimate the expected position of the target at next measurement—for example in terms of polar co-ordinates. Some of these factors are position, speed, turning rate and acceleration of the target at the latest measurement and functions for estimating the corresponding values at the next measurement. One parameter of these functions is the so far unknown value of the time difference between the latest and the next measurement for the current track. Values on position, turning rate and acceleration of the track are written in the corresponding memory cells for the actual track in memory unit 7. For straight flight hypothesis the function for position decision is indicated in the right part of formula $a_1$.

The positional uncertainty depends, among other things, on the time difference between the latest and the next measurement for the current track. The growth in the positional uncertainty can be achieved in different ways, for example with the right part of the formulas $a_1$ and $a_2$ below, or with Kalman filtering. Necessary parameters—with the exception of the time difference—in functions needed to calculate the positional uncertainty are stored in the corresponding memory cells in the memory unit 7.

The measured Doppler shift may—but need not—be used to calculate the radial speed and thereby to verify the radial component of the target speed.

The required number of pulses may be calculated in different ways. One way is based on the known technique that combines the requirements of detection, range accuracy, range resolution and Doppler resolution.

The maximal time difference between the latest and the next measurement for the current track is calculated while considering the fact that the position uncertainty region of the target is to be completely included in the sector formed by one monopulse. The position uncertainty-region grows according to the right term of the formulas $a_1$ and $a_2$; see also FIG. 3. The searched time point is calculated according to formulas $a_1$ and $a_2$.

The minimal time difference between the latest and the next measurement for the current track is calculated while considering the workload and illumination strategy. High workload is a reason to wait a certain minimum amount of time between two illuminations of targets of a certain type. As regards illumination strategy, rules for restricted radar illumination on targets of certain types are intended.

An optimal time difference between the latest and the next measurement for the current track is calculated among other things as a function of minimal and maximal time difference. The optimal measurement time difference may, for example, be chosen so that a certain percentage of the difference between the minimal and maximal time difference is less than the optimal time difference.

Figure 2:
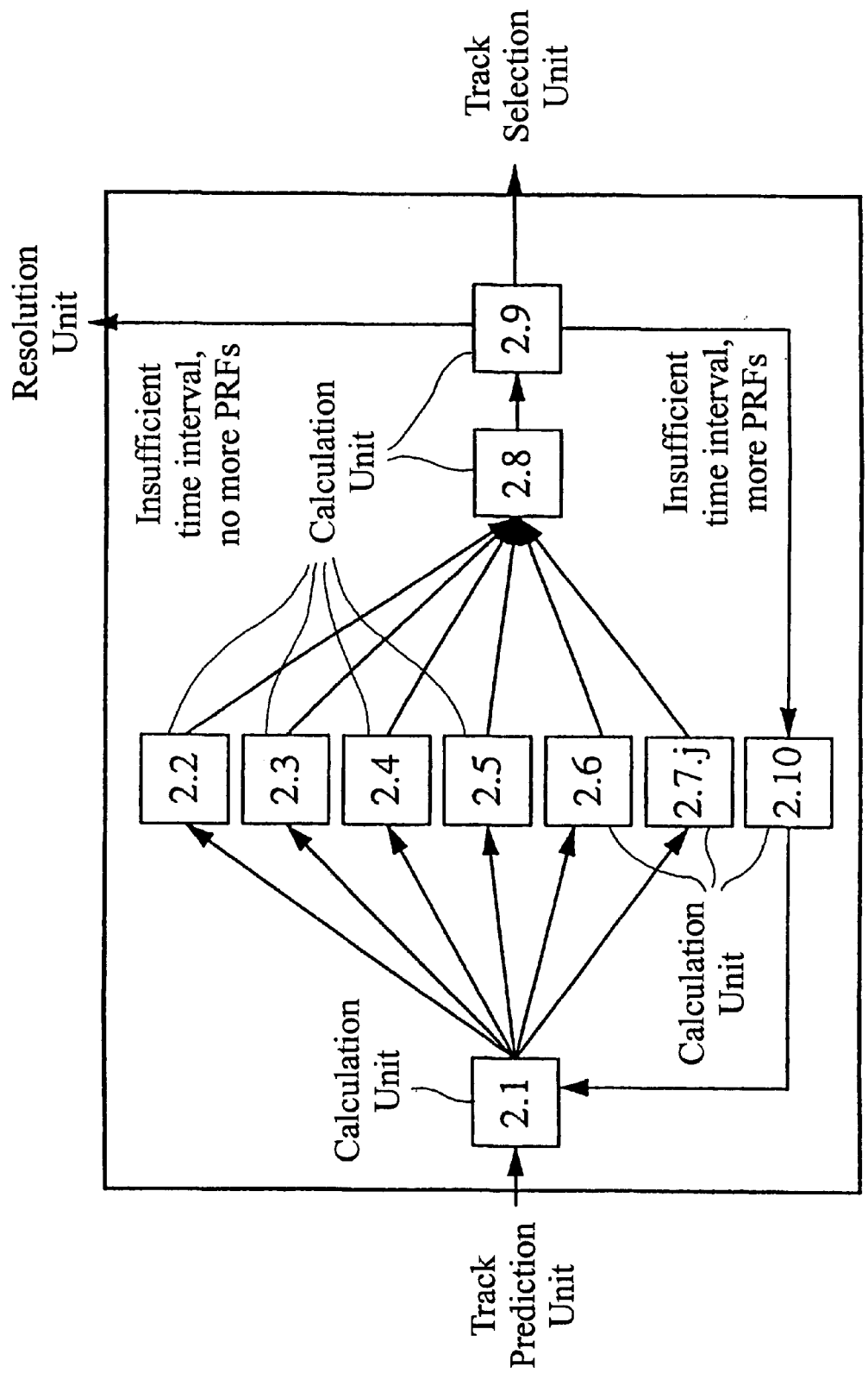
FIG. 2 shows the principal structure of one embodiment of the scheduling unit 2 in FIG. 1.

The scheduling unit 2 is formed by a plurality of calculation units which may be connected according to FIG. 2.

A first calculation unit 2.1, selects the maximal PRF value from a given number of PRF values.

A second calculation unit 2.2, based on this maximal PRF value, calculates zero or one time interval between the time difference limits. Facts about the storage of information about time intervals are discussed in connection with the memory unit 7.

A third calculation unit 2.3, by using the selected PRF value from the first calculation unit 2.1, calculates zero, one or more time intervals during which the range-unambiguity condition is satisfied. This requirement means that the radial extension of the uncertainty-region of the position of the target is completely included in one single range-unambiguity interval during the time of the measurement. This may be calculated in the following way, as further demonstrated in FIG. 3.

The time point for moving the target to the closest edge of the uncertainty-region is given by formula $a_1$ and the time point for moving the target to the furthest edge of the uncertainty-region is given by formula $a_2$, where n=0, 1, 2, 3 . . . . The other variable names are explained below. For an approaching target (i.e. a target that approaches the radar) the first time point, t in $a_1$, constitutes the upper limit for a time interval and the second time point, t in $a_2$, constitutes the lower limit for a time interval. For a departing target the situation is reversed. At most one time interval can be formed for each value of n.

$$n*c/(2*prf) + t_{pulse} < r_0 + t*v_r \mu_l(t) \quad (a_1)$$

$$r_0 + t*v_r - \mu_u(t) < (n+1)* c/(2* prf) + t_{pulse} < \quad (a_2)$$

where
n=an integer greater than or equal to zero,
c=the speed of light,
prf=pulse repetition frequency,
$t_{pulse}$=length of measurement time interval,
$r_0$=range at the latest measurement,
t=time interval between the latest and next measurement,
$V_r$=the radial speed of the target, positive only if the target-radar range increases,
$\mu_l(t)$=the range between the straight-line flight path and the closest edge of the uncertainty-region, which may be calculated by the Kalman filter but also may be approximated to $k_l*t^2$, $k_l>0$.
$\mu_u(t)$=the range between the straight-line flight path and the furthest edge of the uncertainty-region, which may be calculated by the Kalman filter but also may be approximated to $k_u*t^2$, $k_u>0$.

A fourth calculation unit 2.4, by using the selected PRF value from the first calculation unit 2.1 and information about the radial speed of the target, calculates whether Doppler blindness prevails; see formula (b). If this is the case with the selected PRF value, an empty time interval sequence is produced, i.e. a sequence with zero time intervals. Otherwise a sequence with one time interval is produced, having the limits zero and positive infinity, respectively.

The following formula for Doppler blindness indicates the blind free part of each range rate unambiguity interval, $$m*\lambda*prf/2 + d_{mar} < v_r < (m+1)*\lambda*prf/2 - d_{mar} \quad (b)$$

where
m=integer greater than or equal to zero,
λ=carrier frequency,
prf=pulse repetition frequency,
$d_{mar}$=blind marginal in each end of the Doppler interval,
$v_r$=the radial speed of the target, positive only if the target radar distance increases.

A target which has a speed within a blind spot will be made invisible to the radar. Since the range rate unambiguity interval depends on the PRF value, a target which was made invisible with one PRF value may become visible with another PRF value.

Figure 4:
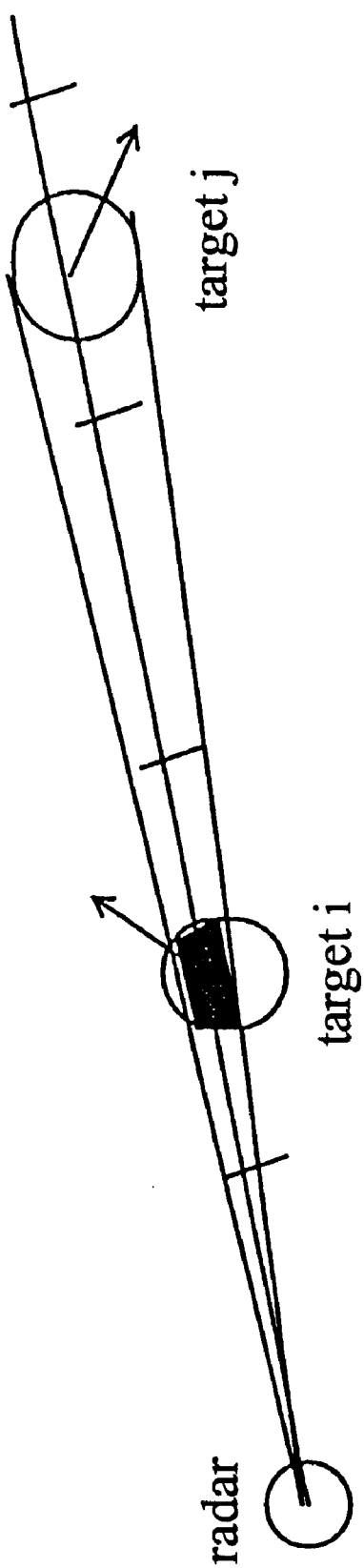
FIG. 4 shows how the beam for target i coincides with the beam for target and FIG. 5 shows a picture of the range-unambiguity interval at three different PRF values, where bold lines denote blind parts of the range-unambiguity in each interval, (a) denotes a position which is blind free at only one of the three PRF values, and (b) and (c) denote positions which are blind free in two and three of the investigated PRF values respectively.
Figure 5:
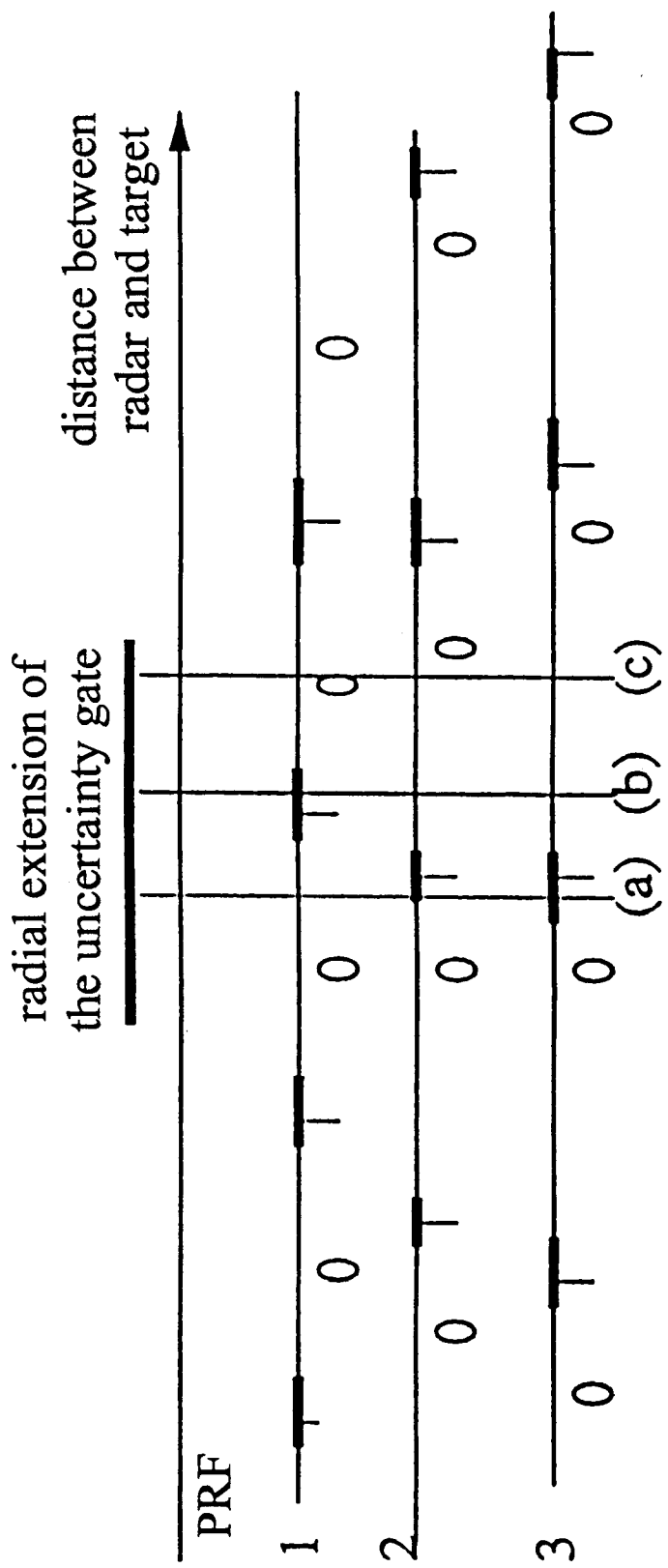

A fifth calculation unit 2.5, by using the selected PRF value from the first calculation unit 2.1, calculates zero, one or more time intervals during which cross-overs do not occur. These time intervals forms a sequence of time intervals. Cross-overs are illustrated in FIG. 4. Cross-over is a state when the uncertainty region for one target is partly or completely hidden by the uncertainty-region for another target. The geometry for this state is time dependent. Simplified calculations of cross-overs might be used. It might prevail at those time points when two or more targets have the same expected bearing, added with such time intervals on both sides of this time point which depend on the mutual relation between the directions of the targets. If the targets head in nearly the same direction, the cross-over period persists for a longer time.

A sixth calculation unit 2.6, by using the selected PRF value from the first calculation unit 2.1, calculates zero, one or more time intervals which are not already allocated for update measurement of other targets. These time intervals form a sequence of time intervals.

It should be noted that information about time intervals for update measurement of other targets may be obtained from track memory cells for "PRF" and "remaining time to measurement", as discussed in connection with memory unit 7, or be administered in a special sequence of time intervals for occupied time intervals.

Zero, one or more seventh calculation units 2.7.j, where j=1,2,3, . . . ,m, use the selected PRF value from the first calculation unit 2.1 to calculate a sequence of time intervals during which measurement can not be carried out for some other reason. One such reason is that a certain part of each time unit must be allocated for search. The complementary set (see definition below) for such allocated time intervals forms a sequence of allowed time intervals for seventh calculation unit 2.7.j. Search is an activity, which consists of searching for new targets in defined areas. This comprises a method which, prior to scheduling track updates, allocates a specific percentage of each selected future time interval for search.

The complementary set to a sequence S of time intervals is a sequence T of time intervals such that exactly those time points which are not included in any time interval in S are included in a time interval in T.

An eighth calculation unit 2.8 performs an intersection operation (see definition below) of all those time intervals or sequences of time intervals which have been obtained from the second through seventh calculation units 2.2–2.7. The result is a sequence of time intervals.

The intersection of two time interval sequences $S_1$ and $S_2$ is a time interval sequence T such that exactly those time points which are included both in a time interval in $S_1$ and a time interval in $S_2$ are included in a time interval in T. This might be written T=intersection($S_1$, $S_2$). The intersection of several time interval sequences $S_1, S_2, \ldots, S_n$, n>2, is then $T_n$, which is achieved from a recursive process $T_n$=intersection($T_{n-1}$, $S_2$) for all n>2 and where $T_2$=T is obtained as described in the previous paragraph.

A ninth calculation unit 2.9 calculates the time for update measurement by using the sequence obtained from the eighth in unit 2.8.

First all intervals are cancelled whose length is smaller than the measurement time length, which can be calculated from the following formula $$T=2*f*w/prf \qquad (c)$$

where
T=length of the measurement interval,
f=a positive integer whose value depends on the needed effect as calculated by the radar equation,
w=integer which gives the number of pulses,
prf=pulse repetition frequency.

If at least one time interval then remains, calculation is made of the beginning of a time interval whose length equals the measurement time length and whose middle point lies as close as possible to the optimal time, which is calculated in the track prediction unit 1 and is an optimal time difference between minimum and maximum measurement time difference. This value of the beginning of the measurement time interval is stored in the memory space for "remaining time to next measurement" in the memory unit 7.

A tenth calculation unit 2.10, if no time interval according to the ninth calculation unit 2.9 remains and there are more PRF values to try, deletes the last selected PRF value from the set of PRF values to try.

If, however, no time interval according to the ninth calculation unit 2.9 remains and no more PRF values remain in the set of PRF values, then resolution is instead performed by resolution unit 5.

The calculation units 2.2–2.7 are independent of each other. They may be arranged in parallel as shown in FIG. 2, or in sequence, in which case intersection is performed at each step between the input time interval sequence and the time interval sequence during the times of which the condition is true. If these steps are performed sequentially, the need for unit 2.8 disappears and the time interval sequence from unit 2.7 is transferred directly to the calculation unit 2.9.

An alternative to this, which takes a longer time to perform is to make an adjustment considering the following soft desirable requirements, namely, minimization of the measurement time length,
closeness to the optimal time point and
centering of the Doppler interval whose limits are calculated with formula (b).

In order to be able to consider these desirable requirements and find the PRF value which gives the best combination of desirable requirements, each requirement may be weighted. This is done by introducing three weight factors and then storing in one memory cell per PRF value—for all PRF values which give at least one possible time interval according to the ninth calculation unit 2.9—the value of the sum of three products. The products are achieved respectively by multiplication of the inversed measurement length and the first weight factor number 1, multiplication of the distance to the optimal time point and the second weight factor number 2, and multiplication of the distance to the center of the Doppler interval and the third weight factor number 3. After performing these calculations for all PRF values, that PRF value is selected which gives the smallest sum, together with the corresponding measurement time interval. This consideration among soft desirable requirements may be selectable, i.e. an object for on/off switching.

The assignment of values to weight factors may be static or dynamic. If static assignment is used, then the weight factors have constant values. If dynamic assignment is used, then the weight factors might be changed by an operator command or controlled by the transmitter/receiver by letting the weight factor for centering of the Doppler interval increase as the signal-to-noise ratio decreases. A suitable initial value assignment for the weight factors is $10^{-1}$, 1 and 1 respectively.

The track selection unit 3 identifies—through comparing investigation among all memory cells which for different tracks contain information about the remaining time to next measurement—the track i of all tracks which has the smallest remaining time to next measurement $K_i$, decreases the value for remaining time to next measurement for all other tracks by the same number $K_i$ and transfers the number of the current track, i, to the transmitter/receiver unit 4. The number $K_i$ indicates an absolute (future), time point namely the time point Now +$K_i$, where Now is the absolute time point for the latest measurement of the radar.

The transmitter/receiver unit 4 consists of transmitter, receiver and antenna for a phased array radar system. The transmitter calculates distance and angle according to functions which earlier have been decided by the track prediction unit 1 for the current track. The number of pulses required for measurement is calculated considering the energy required for target illumination. The PRF value which has been calculated and stored in the state vector is used. The phase shift in the different elements of the antenna is calculated so that a coherent pulse train is directed into the desired direction. The transmitter/receiver unit 4 stays in a delay state, and at the time point Now +$K_i$ the transmission of the pulse train is started. The receiver infers the distance to the target by calculation of the time delay of the received pulses. Further, distance and radial speed are calculated. These data are registered at the state vector of the track. The value of the absolute time point for the latest measurement, Now, is updated by addition of the value for $K_i$.

If a target echo is not detected, a new attempt to take a measurement is immediately made, which means that the values for minimal measurement time difference and optimal time difference are set to zero, and scheduling unit 2 is started anew. Such renewed measurement attempts after a missed detection are normally repeated a few times (0–2). If a target echo is still not detected, the track is deleted, which means that it is not studied any further by this or other units. In renewed measurement attempts alternative target track hypothesises may be used.

The resolution unit 5 calculates the resolution frequencies and possible time intervals for resolution. Resolution means that the target is illuminated sequentially with a small number (s) of pulse trains with different PRF values. At most m of these pulse trains (m<s) are allowed to have overlapping intervals for range blindness (that is the blind time interval between two adjacent range-unambiguity intervals) in the uncertainty region of the target. The calculation in resolution unit 5 is performed only if scheduling unit 2 could not deliver a measurement time interval for a single PRF value.

The memory unit 7 consists of a memory having the required memory cells. These calls can be grouped according to the data stored within them.

A number of memory cells 7.1 may be designated for storing the values of all selectable PRF values. These values are constant and used by scheduling unit 2.

A memory cell 7.2 may be designated for storing the absolute time point Now for the latest measurement of the radar. The content in this cell is used and changed by the transmitter/receiver unit 4.

A number of groups of memory cells 7.3 may be designated, with, each group representing a time interval. Each such group of cells holds information about the start and end of the time interval, and a track number and a pointer to another memory cell group which also represents a time interval—the pointer is a number or an address to the other cell group. A group of this type is a time interval object. A chain of time interval objects linked together represents a time interval sequence. Time interval objects are allocated and processed by the scheduling unit 2. Time interval sequences are also created and maintained.

A group of memory cells 7.4 may be designated for storing the state vector for each track. This vector has elements for:

| | |
|---|---|
| track number i | is assigned at track initiation by unit 6. Each track has a unique number. |
| distance at the latest measurement | is calculated by unit 1; used by unit 4. |
| bearing at the latest measurement | is calculated by unit 1; used by unit 4. |
| speed at the latest measurement | is calculated by unit 1; used by unit 4. |
| course at the latest measurement | is calculated by unit 1; used by unit 4. |
| growth factors $k_l$, $k_u$, for positional uncertainty | is calculated by unit 1; used by unit 4. |
| minimal (measurement) time difference may be constant or depend on the target volume; | is calculated by unit 1; used by unit 2. |
| maximal (measurement) time difference | is calculated by unit 1; used by unit 2. |
| optimal time point | is calculated by unit 1; used by unit 2. |
| function for calculation of how a predicted position depends on the time difference between the last and next measurement | is calculated by unit 1; used by unit 4. |
| function for calculation of how predicted positional uncertainty depends on the measurement time difference | is calculated by unit 1; used by unit 2. |
| radar target area | is calculated by unit 4; used by unit 4. |
| planned PRF value for the next measurement | is calculated by unit 2; used by unit 4. |
| planned measurement time | is calculated by unit 2: used by units |
| length for the next measurement | 2 and 3. |
| remaining time to the next measurement $K_i$ | the time difference between the time point for start of next measurement of this trace and the time point for the latest measurement which is stored in the memory cell Now; $K_i$ is calculated by unit 2; used and changed by unit 3. |
| time interval sequence N for possible measurement (see point 7.3); | is calculated and used by units 2 and 3. |

It should be noted that, with regard to this last element, there is one implementation version with and one without a special time interval sequence for occupied time intervals. If this sequence is present, data for the time intervals for the next measurement for each track will be stored in this element. If the special time interval sequence for occupied time intervals is not present, time data for next measurement of each track might instead be stored only in the memory cell for remaining-time-to-next-measurement $K_i$.

A group of memory cells 7.5 may be designated for storing those data about antenna and effect that are needed in the radar equation. This data is used for calculation of the pulse number in the transmitter/receiver unit 4.

The units 3, 4, 1 and 2 (in this order) constitute a sequence of units which normally process one target track per turn. As a first exception, if the PRF value can not be calculated in unit 2, resolution is performed in unit 5 as well. As a second exception, if no echo from the target is detected in the transmitter/receiver unit 4, a new scheduling is made by unit 2 without any intermediate processing in unit 1. If no echo is detected even after repeated measurement attempts, the target track is finished.

I claim:

1. A phased array radar system for target tracking having a transmitter/receiver unit that forms a waveform and directs a beam toward a target, comprising: a track initiation unit for initiating new tracks, the track initiation unit connected to a track prediction unit which predicts an expected position and a calculated position uncertainty of the target as a function of time and a minimal, a maximal and an optimal time difference to a next measurement, a scheduling unit connected to the track prediction unit which performs an independent calculation of a sequence of possible time intervals to the next measurement for each one of two conditions, namely that the measurement time difference will be placed between the calculated minimal and maximal time differences and that range-unambiguity will prevail, and then performs an intersection operation between the so calculated sequences of time intervals in order to calculate the optimal time difference to the next measurement, a track selection unit connected to the scheduling unit, which selects that track which has a shortest remaining time interval, $K_i$, to the next measurement and decreases a time interval to the next measurement for all other tracks with $K_j$, the track selection unit connected to the transmitter/receiver unit which, after directing the beam, registers an echo from the target and calculates values for distance, speed, and bearing, and for uncertainty in the distance and speed calculations, which values are transferred to the track prediction unit.

2. The radar system according to claim 1, further comprising a resolution unit connected to the scheduling unit for calculating resolution frequencies and possible measurement times for resolution if the scheduling unit is not able to calculate any pulse repetition frequency.

3. The radar system according to claim 1, further comprising a memory unit connected to the track prediction, scheduling, track selection, transmitter/receiver, and track initiation units which stores needed facts for calculations and results of the calculations.

4. The radar system according to claim 3, wherein the scheduling unit calculates the optimal time difference to the next measurement by, firstly selecting a maximal possible pulse repetition frequency (PRF) value among a number of predefined values, secondly calculating that sequence of time intervals for each condition, which covers exactly those time points during which the two conditions are satisfied, thirdly performing an intersection operation on the so calculated sequences of time intervals which generates a time interval sequence N, fourthly calculating a measurement time interval whose length equals a measurement time length, is placed entirely within the time interval sequence N and whose central point lies close to an optimal time point, and fifthly storing a starting time point for the measurement time interval in that cell of the memory unit which stores remaining-time-to-measurement, $K_i$, in a state vector of track i.

5. The radar system according to claim 4, wherein, if no measurement time interval has been obtained and more PRF values remain, the scheduling unit eliminates a latest selected PRF value, whereafter calculation of the optimal time difference in the scheduling unit is repeated.

6. The radar system according to claim 5, wherein, if no PRF value remains among predefined PRF values, the scheduling unit signals the resolution unit to perform resolution.

7. The radar system according to claim 3, wherein the memory unit contains memory cells which store values for all selectable PRF values, data about an absolute time point for a latest measurement of the radar, data about time interval sequences, and data about a current state of every track including a memory address to a time interval sequence for possible measurement time points and memory cells for the minimal, the maximal and the optimal time differences to the next measurement respectively and remaining-time-to-measurement, $K_i$.

8. The radar system according to claim 4, wherein the scheduling unit calculates an additional sequence of time intervals for a new condition and performs an intersection operation on this additional time interval sequence and the sequences achieved from the two conditions, where the new condition relates to Doppler blindness avoidance.

9. The radar system according to claim 4, wherein the scheduling unit calculates an additional sequence of time intervals for a new condition and performs an intersection operation on this additional time interval sequence and the sequences achieved from the two conditions, where the new condition relates to cross-over avoidance.

10. The radar system according to claim 4, wherein the scheduling unit calculates an additional sequence of time intervals for a new condition and performs an intersection operation on this additional time interval sequence and the sequences achieved from the two conditions, where the new condition relates to freedom from overlapping.

11. The radar system according to claim 4, wherein the scheduling unit calculates an additional sequence of time intervals for a new condition and performs an intersection operation on this additional time interval sequence and the sequences achieved from the two conditions, where the new condition relates to search.

12. The radar system according to claim 4, wherein the scheduling unit, for all those PRF values that give time interval sequences with at least one time interval of sufficient length, firstly, calculates the length of the measurement time interval, minimum distance to the optimal time point and distance to a Doppler central point, secondly, fuses those values by multiplying an inverted measurement time length with a first weight factor, the minimum distance to the optimal time point with a second weight factor and the distance to the Doppler interval central point with a third weight factor and summing, and thirdly, selects that PRF value which gives a smallest so calculated sum.

13. The radar system according to claim 12, wherein the scheduling unit uses weight factors of $10^{-1}$, 1 and 1 for the first, second and third weight factors, respectively.

14. The radar system according to claim 1, wherein the scheduling unit performs a new series of calculations with parameter values for minimal and optimal time difference set to zero, if the transmitter/receiver unit (4) can not register any echo from the target.

15. The radar system according to claim 14, wherein the track prediction unit changes a track hypothesis between each new measurement.

* * * * *